A. WYCKOFF.

BARREL-MACHINE.

No. 6,813.

Reissued Dec. 21, 1875.

WITNESSES:

Edw.d Payson

E. H. Williams

INVENTOR.

Arcalous Wyckoff

Per Edw. E. Lumby

Atty.

N. PETERS, PHOTO-LITHOGRAPHER, WASHINGTON, D. C.

UNITED STATES PATENT OFFICE.

ARCALOUS WYCKOFF, OF ELMIRA, N. Y., ASSIGNOR TO THE SEAMLESS KEG AND CAN COMPANY, OF SAME PLACE.

IMPROVEMENT IN BARREL-MACHINES.

Specification forming part of Letters Patent No. 51,643, dated December 19, 1865; reissue No. 6,813, dated December 21, 1875; application filed March 3, 1875.

DIVISION A.

*To all whom it may concern:*

Be it known that I, ARCALOUS WYCKOFF, of Elmira, Chemung county, New York, have invented certain Improvements in Barrel-Machines, of which the following is a specification:

My invention relates to machinery for forming barrels by annular compression, and also hooping barrels; and it consists in the combination, with each other, of two flaring cup-dies, one of which has a reciprocating rectilinear motion in suitable guiding-ways toward and from the other, imparted by means of a powerful screw or lever, to which the required force is applied at the pleasure of the operator.

Figure 1:
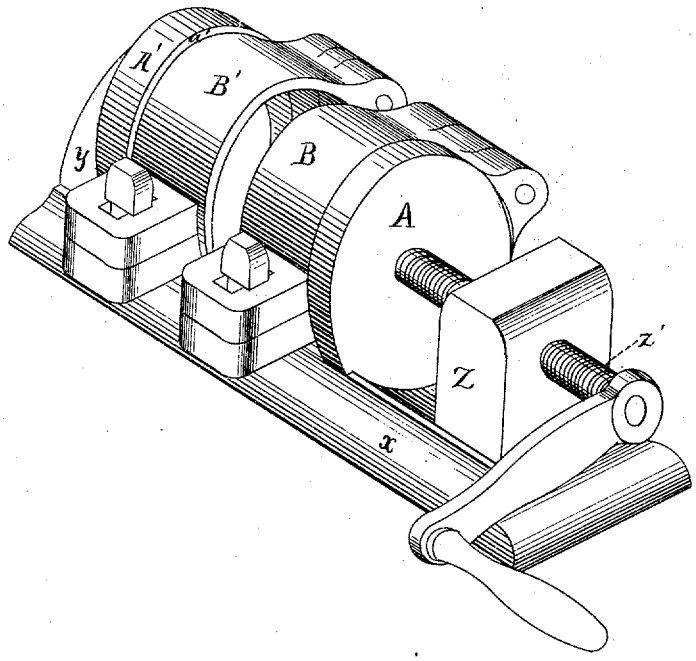
Figure 2:
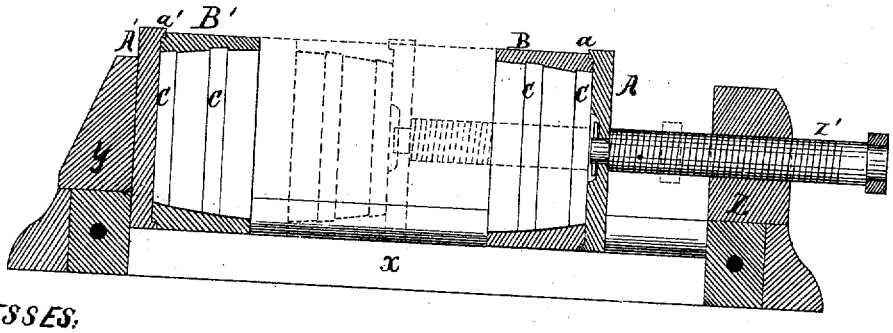

In the drawings, Figure 1 represents my machine in isometrical perspective, and Fig. 2 represents a longitudinal section of the same in a vertical plane through the center.

The bed of my machine *x* is grooved lengthwise upon its upper surface, and at the ends is provided with the upright standards *y* and *z*. The standard *z* has a hole through it, provided with a female screw-thread, which engages the male thread of the screw-bolt *z'*. The inner end of the bolt *z'* is loosely centered and keyed in the circular disk A. The lower portion of the periphery of this disk fits and slides in the grooved bed. The disk A is also provided with the laterally-projecting flange *a*, which embraces the exterior of the two-parted die or jaws B. These jaws are hinged together, and provided with suitable lips and keys to admit of their being firmly secured, as shown in Fig. 1. The interior surface of the jaws, when closed, has a curved inward taper, corresponding to the shape of the bulge of a barrel, and is provided with two annular recesses, C C, for containing the hoops required for a barrel when it is desired to apply hoops by means of the machine.

The number of recesses may be varied according to the number of hoops required.

It will be seen, on reference to the drawings, that another pair of jaws, B', of like construction, are embraced by the flange *a'* of another circular disk, A', which rests in the opposite end of the grooved bed, and is backed up by the standard *y*.

For convenience I designate the jaws, when closed ready for operation, as flaring cup-dies.

It is the object of my invention to compress into the ordinary shape of a barrel a cylindrical sheet of wood cut from a solid block, and at the same time, if desired, to apply the hoops thereto; or my invention may be used to force the hoops into their positions upon any kind of a barrel.

In operating my machine the dies are separated to admit the placing of a barrel-cylinder between them, so that the ends of the cylinder are respectively embraced by the mouths of the dies. The barrel-heads stand in their grooves within the cylinder. Power is then applied to the screw-bolt *z'*, forcing the die A toward the die A'. This crowds the cylinder into the cup-dies, and, as the distance between them lessens, gradually effects an annular compression of the fiber until the cylinder has assumed the shape of the inside of the dies, and thus acquired the tapering form of a barrel.

If hoops are to be applied, they are placed in the recesses C C prior to the commencement of the operation, and upon its completion the dies are opened by detaching the keys and separating the jaws, so that the finished barrel can be removed.

I claim as my invention—

The two flaring cup-dies B and B', each composed of two parts hinged together, and a suitable guiding and supporting bed, in combination with a device for imparting a reciprocating rectilinear motion to one die toward and from the other, substantially as and for the purposes set forth.

ARCALOUS WYCKOFF.

Witnesses:

J. J. CURTIS,

THOS. M. DE WITT.